2,944,036
PLASTIC SOLDER COMPOUND

Don E. Floyd, Robbinsdale, and William J. Ward, Minneapolis, Minn., assignors to General Mills, Inc., a corporation of Delaware No Drawing. Filed May 3, 1957, Ser. No. 656,747

4 Claims. (Cl. 260—18)

This invention relates to new and useful metal-to-metal bonding compositions. As such they are useful as seam fillers, plastic solders, auto body solders, and calking compounds. They may also be used for bonding non-metallic surfaces and objects.

Many compositions have been proposed and some have found limited applications in the field of auto body solder. However, all have had certain draw-backs and have not met with complete success. One reason for this fact is the rigid and tough standards and specifications to which these products must conform. A few of the requirements for a successful body solder are as follows.

(1) Trowelability
(2) No sagging at 75° to 77° F.
(3) No sagging when cured vertically at 250° F. for 20 minutes
(4) No serious change in appearance when baked at 400° F. for 15 minutes
(5) No cracks during cooling after curing
(6) Good adhesion to steel and other metals
(7) Good sanding qualities
(8) Resistance to vibration
(9) Satisfactory appearance on passing through common painting schedules
(10) Resistance to standard weathering tests including immersion in water, exposure to ultraviolet light rays, exposure to high humidities and to changes in temperature
(11) Resistance to bending
(12) Resistance to mechanical shock and impact
(13) Ease of application The compositions of this invention have met and do fulfill the above requirements of a good auto-body solder as well as having other readily recognized advantages. One such advantage of these compositions is that they are thixotropic and have a good degree of permanency as respects their thixotropy. Another advantage to the compositions of this invention is that they contain no volatile constituents and do not expel gases upon curing. A still further advantage is that they have the correct rate of curing for applications of this type which is accomplished by a minimum of shrinkage. One other very important advantage of the compositions of this invention is the low toxicity of the ingredients.

Other objects and advantages to this invention will become apparent upon reading the subsequent specification.

It has now been discovered that a thixotropic, heat curing composition suitable for use as a body solder may be prepared by mixing the following components (a) an amino-polyamide, (b) an epoxy resin, (c) a modified clay flow control agent, (d) a polar hydroxyl containing organic compound, and (e) an inorganic filler.

The amino-polyamide resins useful in the above compositions are those in which an excess of polyamine is employed in their preparation from polymeric fat acids and polyamines which results in a polyamide having unreacted amino groups. The amount of these unreacted amino groups can be measured by determining the amine number, the amine number being the number of milligrams of KOH equivalent to the free amine groups in a one gram sample of the resin. Generally speaking, the amino-polyamide resins employed in this invention should have an amine number in the range of 150 to 400 with a preferred range of from 200 to 350.

The polyamines employed to react with the above described polymeric fat acids in the preparation of the aminopolyamide resins have the general formula $H_2NR(NHR)_pNH_2$ where R is an alkylene radical and $p$ is a whole integer less than 6. Illustrative polyamines are diethylenetriamine, triethylenetetramine, tetraethylenepentamine, di-1,3-propanetriamine, tri-1,3-propanetetramine, di-1-2-propanetriamine, and the like. Thus, the alkylene radical in the above formula is generally ethylene but should not be limited thereto.

It will be seen that in order to obtain an amino-polyamide resin of the type employed in this invention, having unreacted amino radicals, it is necessary to employ polyamines that are at least tri-functional amines and generally speaking, at least one and often two amine groups in each molecule will be tied up in the amide linkages. When one of the amine groups that react to form the amide is a secondary amine, at least one of the terminal primary amines will be free in the form of a branched chain in contrast to a linear amino-polyamide resulting from the reaction of both primary amine groups to form the amide linkages. Under normal conditions the polyamine will react with the polymeric fat acids to form a random mixture of branched and linear type linkages.

The "polymeric fat acids" employed in preparing the polyamide resins are those resulting from the polymerization of drying or semi-drying oils, or their free acids or the simple aliphatic alcohol ester of these acids, i.e., sources rich in linoleic acid. Suitable drying or semi-drying oils include soybean, linseed, tung, perilla, cottonseed, corn, sunflower, safflower, and dehydrated castor. Suitable fatty acids may also be obtained from tall oil, soapstock, and other similar material. In the polymerization process for the preparation of the polymeric fat acids, the fatty acids with sufficient double bond functionality combine for the most part, probably by a Diels-Alder mechanism, to provide a mixture of dibasic and higher polymeric fat acids. These acids are often referred to as dimers, trimers, etc. In place of this method of polymerization, any other method of polymerization may be employed whether the resultant polymer possesses residual unsaturation or not. Thus the term "polymeric fat acids" as used herein is intended to include the polymerized mixture of acids, which usually contain a predominant portion of dimer acids, a small quantity of trimer and higher polymeric fat acids and some residual monomer.

It has been postulated that the structural formula of the dimer acid from linoleic acid is as follows:

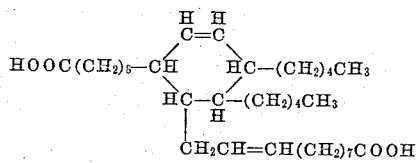

$$CH_2CH=CH(CH_2)_7COOH$$

The trimer is then formed from the dimer by a Diels-Alder reaction with linoleic or linolenic acid at either of the double bonds shown in the above formula. It will be appreciated that the polymeric fat acids will, as a practical matter, result from fatty acid mixtures that contain a preponderance of linoleic acid since the only naturally occurring poly-unsaturated acid available in large quantities is linoleic acid. It should also be appreciated that since linoleic acid occurs in nature as a complex mixture in every instance, it is available in various degrees of purity ranging from relatively expensive pure linoleic acid that has been laboriously purified to crude sources such as tall oil and soapstock which contain substances other than fatty acids. In actual practice linoleic acid rich mixtures of fatty acids are used to prepare the polymeric fat acids. One may obtain the linoleic acid rich fatty acids by separating a major portion of the oleic and saturated fatty acids from any convenient and economical source of fatty acids having a high iodine value. In addition, polymeric fat acids are readily available commercial products. One such product is "Empol 1022" as sold by Emery Industries, Inc.

The epoxy resins (glycidyl polyethers) employed in this invention are complex polymeric reaction products of polyhydric phenols with polyfunctional halohydrins and/or glycerol dichlorohydrin. The products thus obtained contain terminal epoxy groups. A large number of epoxy resins of this type are disclosed in Greenlee Patents 2,585,115 and 2,589,245. Several of these resins are readily available commercial products.

Typical polyhydric phenols useful in the preparation of epoxy resins include resorcinol and various bisphenols resulting from the condensation of phenol with aldehydes and ketones such as formaldehyde, acetaldehyde, acetone, methyl ethyl ketone, and the like. A typical epoxy resin is the reaction product of epichlorohydrin and 2,2-bis(p-hydroxy phenyl) propane (Bisphenol A), the resin having the following theoretical structural formula:

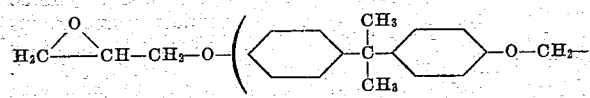

where $n$ is 0 or an integer up to 10. Generally speaking, $n$ will be no greater than 2 or 3 and is preferably 1 or less.

Epoxy resins may be characterized further by reference to their epoxy equivalent weight, the epoxy equivalent of pure epoxy resins being the mean molecular weight of the resin divided by the mean number of epoxy radicals per molecule, or in any case the number of grams of epoxy resin equivalent to one mole of the epoxy group or one gram equivalent of epoxide. Epoxy resins having an epoxy equivalent weight of 100 to 300 are suitable for use in this invention, the preferred range being 150 to 250.

"Flow control agents" as used in this specification refer to cation-modified clays, which originally exhibited a base-exchange capacty of at least 25, in which the exchangeable inorganic cation has been exchanged for onium base capable of replacing the inorganic cation to an extent sufficient to form with the clay onium an onium-clay swelling to at least 10-fold in nitrobenzene, such as ammonium, phosphonium, oxonium, sulfonium, arsonium, stibonium, and telluronium bases, and with a hydrophobic radical having a molecular area of at least 70 square angstrom units. These flow control agents are described in Hauser, U.S. Patent No. 2,531,427, patented November 28, 1950, entitled "Modified Gel-Forming Clay and Process of Producing Same." The preferred "flow control agents" have the formula $(T)_4N^+$ bentonite$^-$ in which two T's are aliphatic hydrocarbon radicals containing 8 to 22 carbon atoms and the other two T's are lower alkyl radicals containing less than 6 carbon atoms. Three illustrative modified clays are dimethyl dioctadecy ammonium bentonite, dimethyl dicoco ammonium bentonite, where "coco" refers to aliphatic hydrocarbon radicals derived from coconut fatty acids, and dimethyl dioctadecyl ammonium cation linked to a clay containing primarily the composition $MgO \cdot 4SiO_2 \cdot 2H_2O$.

The activator for the above flow control agents is a polar or slightly polar compound which causes the thickening effect and development of thixotropy when blended with the above flow control agents. The preferred class of activators are polar, hydroxyl containing organic compounds such as all types of alcohols and glycols. A few such compounds are ethyl alcohol, mono buty ether of ethylene glycol, glycerol, triethylene glycol, polyethylene glycol 300, lauryl alcohol, sorbitan esters of fatty acids and polyoxyalkylene sorbitan esters of fatty acids. Of these activators the non-volatile members are preferred due to the fact that they yield compositions having excellent thixotropy characteristics, especially in regard to its permanency and do not expel volatile matter which may cause the cured product to be too porous.

Structurally, a suitable class of activators has the formulas:

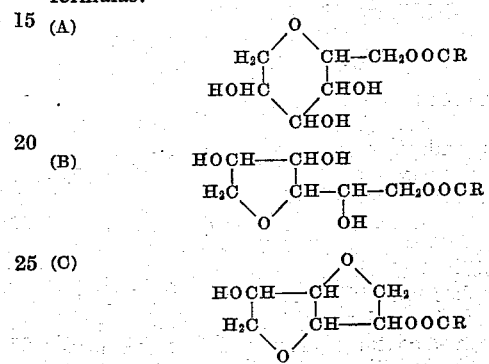

where R is a straight-chained hydrocarbon radical containing 7 to 21 carbon atoms and is preferably the residue from lauric, oleic, or stearic acid. Compounds of this class can then be reacted with ethylene oxide to form polyoxyalkylene derivatives that are also highly effective. An example of this class of derivatives is

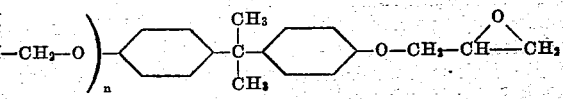

where $n$ is an integer up to 10 and is generally in the range of 3 to 8.

Suitable inorganic fillers which may be employed in this invention are those of small particle size having a particle size of from 250 to 400 mesh, preferably about 325. Illustrative fillers are granular aluminum powder, iron powder, iron oxide powder, talc and alumina, powdered glass fibers, sintered nylon powder, naturally occurring clays, and other powdered metals, oxides, silicates, and carbonates. An example of a naturally occurring clay is kaolin clay. A typical clay of this type will analyze about 60% silica and 40% alumina.

The relative proportions of the various ingredients contained in the compositions may vary from 30 to 70 parts of the amino polyamide, 30 to 70 parts of the epoxy resin, 20 to 40 parts of the modified bentonite clay, 1 to 10 parts of the activator and 15 to 60 parts of the inorganic filler.

This invention can be further illustrated by reference to the following examples in which all "parts" are expressed as parts by weight and all "percentages" are expressed as percentage by weight, unless otherwise specified. Likewise, the various testing procedures employed were conducted as follows:

*Impact test*

A layer of plastic solder ½ inch thick is applied to 1/16 inch steel plate. The solder is cured. Repeated impacts of 2.3 footpounds on a ball-head of ½ inch radius are applied to the back side of panel. The number of blows required to cause loosening or cracking are recorded as the impact test number.

Sanding test

The surface of the solder and the surrounding metal are sanded with a disc sander. The plastic solder is examined for voids and smoothness. The surfaces are enameled and compared for gloss with the coated steel. A rating of 1 is excellent and of 5 is very poor.

Bend test A

The body solder is used as an adhesive for lap shear joints on 24ST aluminum and the cured, adhered joints are subjected to the bend test defined in Military Specification 5090–B. Values are recorded in pounds per square inch to flexural failure.

Bend test B

Steel panels of 4″ x 6″ x 0.04″ are formed into a coach joint by spot welding two of the panels along the 4″ dimension and bending the panels to a coach joint having a T shaped cross section having a 1″ leg with 5″ arms. The joint is filled with plastic solder and cured. The panel is then placed in a jig and bent quickly to the shape when the arms of the T form 45° angles with the leg of the T. Any failure, such as cracking, peeling, chipping, etc., is noted.

Thixotropic test

A layer of uncured plastic solder 3/16″ thick, is applied to a steel plate. The plate is placed vertically in an oven, held at 250° F. for 20 minutes. The solder must flow no more than 1/16 of an inch vertically down the panel.

Falling ball impact test

An unsupported block of cured plastic solder, measuring 2″ x 2″ x 0.5″, is laid on an anvil and subjected to the cumulative effect of steel balls of increasing diameter striking the center from a height of 36 inches, in accord with Military Specification MIL–I–16923B, at 73° F. The weight of ball causing the block to shatter is recorded. The test may also be conducted at lower temperature.

EXAMPLE I 100 parts of amino-polyamide, 100 parts of epoxy resin, 45 parts $Fe_3O_4$ powder, 15 parts of a clay material containing approximately 60% silica and 40% alumina, 54 parts of dimethyl dioctadecyl ammonium bentonite, and 5.4 parts of polyoxyalkylene sorbitan laurate were mixed to produce a thixotropic body solder composition. This product passed Bend Test B, scored 4 on the impact test and had a sanding test rating of 1.

The amino-polyamide described above was prepared by reacting polymeric fat acids, containing a preponderance of di-linoleic acid, with triethylene tetramine to obtain a preliminary amino-polyamide having an amine number of about 210, adding sufficient tetraethylene pentamine, and continuing the reaction to prepare an amino-polyamide having an amine number of about 300.

The epoxy resin employed in this example was a reaction product of bis-phenol A and epichlorohydrin having an epoxy equivalent weight of about 185.

EXAMPLE II

The same formulation as shown in Example I was tested for bend strength by method A, except that 60 parts aluminum powder was added as the filler. The bend strength observed was 145 pounds per square inch (p.s.i.).

EXAMPLE III

The same formulation as shown in Example I was tested for bend strength by method A, except that 30 parts aluminum powder and 30 parts of the clay material were added as the filler. The bend strength observed was 160 p.s.i.

EXAMPLE IV

The same formulation as shown in Example I was tested for bend strength by method A, except that 60 parts of the clay material was added as the filler. The bend strength observed was 160 p.s.i.

EXAMPLE V

Table I below shows the results obtained by varying only the filler of the formulation shown in Example I.

TABLE I

| Filler | Parts of Filler Added, grams | Bend Strength (Bend Test A) | Panel Impact Test (Average Value) |
| --- | --- | --- | --- |
| Aluminum Powder | 20 | 145 | 0.7 |
|  | 60 | 125 | 3.1 |
|  | 100 | 105 | 2.3 |
| $Fe_3O_4$ Powder | 20 | 105 | 4.0 |
|  | 60 | 115 | 5.1 |
|  | 100 | 65 | 3.1 |
| Natural Clay | 20 | 160 | 2.3 |
|  | 60 | 80 | 1.8 |
|  | 100 | 65 | 1.3 |

EXAMPLE VI 50 parts of an amino-polyamide, having an amine number of about 300, 17.5 parts of aluminum powder (325 mesh), 10 parts of dimethyl dioctadecyl ammonium bentonite, and 1 part sorbitan mono-oleate were blended together. A second mixture was prepared by blending 50 parts of an epoxy resin derived from bis-phenol A and epichlorohydrin having an epoxy equivalent weight of about 180, 5 parts aluminum powder (325 mesh) 7.5 parts of a kaolin clay, 17 parts of dimethyl dioctadecyl ammonium bentonite and 1.7 parts of sorbitan mono-oleate.

The two mixtures were blended together in a 1 to 1 ratio to form a mixture which passed the thixotropic test. After curing on aluminum panels the bend strength as tested by Bend Test A was 190 p.s.i.

EXAMPLE VII

Mixtures identical to those shown in Example VI were prepared except that the polyoxyalkylene derivative of sorbitan mono-oleate, was used in place of sorbitan mono-oleate itself. These mixtures were blended to form a mixture which passed the thixotropic test and after being cured on an aluminum panel had a bend strength of 265 p.s.i. as tested by Bend Test A.

EXAMPLE VIII

Mixtures identical to those shown in Example VI were prepared except that the polyoxyalkylene derivative of sorbitan mono-laurate was used in place of sorbitan mono-oleate. These mixtures were blended together to form a mixture which passed the thixotropic test and after being cured on an aluminum panel had a bend strength of 320 p.s.i. as tested by Bend Test A.

EXAMPLE IX

Table II shows the results of various experiments using several commercially available epoxy resins at varying levels of concentration in body solder mixtures in which the remaining ingredients in the formulation were identical. The various quantities of epoxy resins shown were combined with 100 parts of an amino-polyamide derived from polymeric fat acids containing a preponderance of di-linoleic acid and having an amine number of about 300, 35% dimethyl dioctadecyl ammonium bentonite based on the quantity of epoxy resin employed, 30% inorganic filler based on the combined weights of epoxy resin and the amino-polyamide, and 3.5% of polyoxyalkylene sorbitan laurate based on the quantity of epoxy resin employed.

TABLE II

| Epoxy Resin [1] | Parts Epoxy Resin | Bend Strength, Bend Test A | Impact Test Number | Bend Test B |
|---|---|---|---|---|
| 1. A (185) | 100 | 150 | 4 | Pass. |
| 2. A (185) | 150 | 145 | 5 | Do. |
| 3. B (180) | 100 | 100 | 2 | Do. |
| 4. C (180) | 100 | 120 | 2 | Do. |
| 5. C (180) | 233 | 100 | 3 | Do. |
| 6. D (190) | 100 | 90 | 1 | Do. |
| 7. D (190) | 185 | 95 | 1 | Do. |
| 8. E (185) | 100 | 105 | 2 | Do. |
| 9. E (185) | 185 | 155 | 9 | Do. |
| 10. A (185) | 100 | 150 | 4 | Do. |
| 11. A (185) | 233 | 145 | 5 | Do. |
| 12. F (190) | 100 | 115 | 7 | Do. |
| 13. F (190) | 233 | 100 | 7 | Do. |
| 14. G (185) | 100 | 110 | 1 | Do. |
| 15. G (185) | 233 | 130 | 2 | Do. |

[1] Commercially available reaction products of Bis-phenol A and epichlorohydrin. The number in parentheses is the approximate epoxy equivalent weight listed by the manufacturer.

EXAMPLE X

Table III tabulates the results of various compositions prepared by mixing the individual components shown.

TABLE III

| Sample Number | 1 | 2 | 3 | 4 | 5 | 6 | 7 | 8 | 9 |
|---|---|---|---|---|---|---|---|---|---|
| Aminopolyamide | a [1] | a | a | a | a | a | a | a | a. |
| Parts of aminopolyamide | 80 | 80 | 80 | 80 | 70 | 70 | 70 | 70 | 70. |
| Epoxy resin | e [2] | e | e | e | e | e | e | e | e. |
| Parts of epoxy resin | 80 | 80 | 80 | 80 | 70 | 70 | 70 | 70 | 70. |
| Filler | Aluminum powder [3] | Aluminum powder. | Aluminum powder. | Aluminum powder. | Aluminum powder. | Aluminum powder. | Aluminum powder. | Aluminum powder. | Aluminum powder. |
| Parts of filler | 80 | 80 | 80 | 80 | 70 | 70 | 70 | 70 | 70. |
| Flow control agent | A [4] | A | A | A | A | A | A | A | A. |
| Parts of flow control agent | 16 | 16 | 16 | 16 | 30 | 30 | 30 | 30 | 30. |
| Activator | Ethanol | Butyl ether of ethylene glycol. | Glycerol | Triethylene glycol. | Lauryl Alcohol. | I [5] | I | I | None. |
| Parts of activator | 4 | 4 | 4 | 4 | 6 | 3 | 6 | 10 | 0. |
| Dispersibility of components | Good | Good | Good | Good | Good | Good | Good | Good | Poor. |
| Thixotropy | do | do | do | do | do | Excellent | Excellent | Excellent | Fair. |
| Porosity | Fair | Fair | Fair [6] | Fair [6] | Good | Good | Good | Good | Good. |
| Appearance after curing | do | do | Good | Good | do | do | do | do | Poor. |

[1] This amino-polyamide had an amine number of approximately 300 and was prepared by reacting polymeric fat acids (predominantly di-linoleic acid) and a mixture of triethylene tetramine and tetraethylene pentamine.
[2] This epoxy resin was a reaction product of Bis-phenol A and epichlorohydrin and had an epoxy equivalent weight of 185.
[3] Granular aluminum powder (approximately 325 mesh).
[4] Dimethyl dioctadecyl ammonium bentonite.
[5] Polyoxyalkylene sorbitan mono-laurate.
[6] Porosity of these compositions can be improved by employing activators with all traces of water removed.

Many modifications and variations of the invention as hereinbefore set forth may be made without departing from the spirit and scope thereof, and therefore only such limitations should be imposed as are indicated in the appended claims.

Now therefore we claim:

1. A thixotropic, heat-curable composition suitable for use as an auto-body solder composed of (a) an amino-polyamide derived from polymeric fat acids and a polyamine having the formula $H_2NR(NHR)_pNH_2$ in which R is an alkylene radical and p is a whole integer of from 1 to 6, said amino-polyamide having an amine number within the range of about 150 to about 400, (b) a glycidyl poly ether of a polyhydric phenol having an epoxy equivalent weight of from 100 to 300, (c) a cation-modified clay flow control agent having the formula $(T)_2(T_1)_2N^+bentonite^-$ where T is an aliphatic hydrocarbon radical containing 8 to 22 carbon atoms and $T_1$ is an alkyl radical containing from 1 to 5 carbon atoms, (d) a nonvolatile polar hydroxyl-containing organic compound as an activator for said flow control agent, said compound being selected from the group consisting of fatty acid mono esters of sorbitan and polyoxyalkylene derivatives thereof, said fatty acids containing from 8 to 22 carbon atoms, and (e) an inert filler selected from the group consisting of aluminum, iron, the oxides thereof and kaolin clay.

2. A composition of matter according to claim 1 in which the components are present in the following relative proportions by weight: (a) 30 to 70 parts, (b) 30 to 70 parts, (c) 10 to 40 parts, (d) 1 to 10 parts, (e) 15 to 60 parts.

3. The method of filling void areas in metallic substances which comprises applying thereto the composition of claim 1 and applying heat to said composition to cure said composition.

4. A thixotropic, heat-curable composition suitable for use as an auto-body solder composed of (a) an amino polyamide derived from polymeric fat acids and a polyamine having the formula $H_2N(NHR)_pNH_2$ in which R is an alkylene radical and p is a whole integer of from 1 to 6, said amino polyamide having an amine number within the range of about 150 to about 400, (b) a glycidyl polyether of a polyhydric phenol having an epoxy equivalent weight of from 100 to 300, (c) a cation-modified clay flow control agent having the formula $(T)_2(T_1)_2N^+bentonite^-$ where T is an aliphatic hydrocarbon radical containing 8 to 22 carbon atoms and $T_1$ is an alkyl radical containing from 1 to 5 carbon atoms, (d) a nonvolatile, polar, hydroxyl containing organic compound selected from the group consisting of fatty acid monoesters of sorbitan and the polyoxyalkylene derivatives thereof, said fatty acids containing from 8 to 22 carbon atoms, and (e) a mixture of kaolin clay with an inert filler selected from the group consisting of aluminum, iron and the oxides thereof.

References Cited in the file of this patent

UNITED STATES PATENTS

| 2,589,245 | Greenlee | Mar. 18, 1952 |
| 2,622,987 | Ratcliff | Dec. 23, 1952 |
| 2,705,223 | Renfrew et al. | Mar. 29, 1955 |
| 2,760,944 | Greenlee | Aug. 28, 1956 |
| 2,768,992 | Zukas | Oct. 30, 1956 |
| 2,773,043 | Zukas | Dec. 4, 1956 |

FOREIGN PATENTS

| 516,107 | Canada | Aug. 30, 1955 |

OTHER REFERENCES

Northwestern Club, Paint, Oil & Chem. Review, Nov. 5, 1953, pp. 72–80 (copy in S.L.)

Chem. Week, Nov. 24, 1956, pp. 42 & 44 (copy in S.L.)

Floyd et al.: Rubber & Plastics Age, May, 1956, pg. 287, col. 2 (copy in S.L.)